United States Patent
Kempf et al.

(10) Patent No.: US 12,431,648 B2
(45) Date of Patent: *Sep. 30, 2025

(54) CONNECTION ELEMENT FOR ELECTRICALLY CONNECTING A FLUID-COOLABLE INDIVIDUAL LINE, FLUID-COOLABLE INDIVIDUAL LINE UNIT, AND CHARGING CABLE

(71) Applicant: BRUGG eConnect AG, Brugg (CH)

(72) Inventors: Urs Kempf, Erstfeld (CH); Oldrich Sekula, Buchberg (CH); Albert Martinez Vall, Baden (CH); Hans Dietiker, Hunzenschwil (CH); Tomasz Oslislok, Bad Zurzach (CH)

(73) Assignee: BRUGG ECONNECT AG, Brugg (CH)

( * ) Notice: Subject to any disclaimer, the term of this patent is extended or adjusted under 35 U.S.C. 154(b) by 99 days.

This patent is subject to a terminal disclaimer.

(21) Appl. No.: 18/196,328

(22) Filed: May 11, 2023

(65) Prior Publication Data

US 2023/0283000 A1 Sep. 7, 2023

Related U.S. Application Data

(62) Division of application No. 17/311,156, filed as application No. PCT/EP2019/082997 on Nov. 28, 2019, now Pat. No. 11,688,964.

(30) Foreign Application Priority Data

Dec. 5, 2018 (CH) ........................................ 1497/18

(51) Int. Cl.
*H01R 13/00* (2006.01)
*B60L 53/16* (2019.01)
(Continued)

(52) U.S. Cl.
CPC ............ *H01R 13/005* (2013.01); *B60L 53/16* (2019.02); *B60L 53/302* (2019.02); *F16L 25/01* (2013.01);
(Continued)

(58) Field of Classification Search
None
See application file for complete search history.

(56) References Cited

U.S. PATENT DOCUMENTS

| 3,244,792 | A | | 4/1966 | Smith | |
|---|---|---|---|---|---|
| 4,199,653 | A | * | 4/1980 | Talley | ...................... H01R 9/11 174/15.7 |

(Continued)

FOREIGN PATENT DOCUMENTS

| DE | 10 2016 117 261 B3 | 11/2017 |
|---|---|---|
| DE | 10 2016 112 306 A1 | 1/2018 |
| WO | WO 2017/162494 A1 | 9/2017 |

*Primary Examiner* — Abdullah A Riyami
(74) *Attorney, Agent, or Firm* — Birch, Stewart, Kolasch & Birch, LLP

(57) ABSTRACT

The invention relates to a connection element for electrically connecting an individual line which has a concentric conductor arrangement (32) and a central passage (33) for a cooling fluid. The connection element comprises an electrically conductive housing (2) with a sleeve-shaped pressing portion which is suitable for producing a press connection to the concentric conductor arrangement (32). The electrically conductive housing (2) here has an internal cooling passage (10) with a connection opening (11) for an external cooling line, said cooling passage leading into a space surrounded by the sleeve-shaped pressing portion. In addition, the connection element comprises a counterpressure element (3) which can at least partially lie in the space surrounded by the sleeve-shaped pressing portion. The counterpressure element (3) is furthermore configured to support the concentric conductor arrangement (32) on the inner side thereof when (Continued)

the sleeve-shaped pressing portion is compressed during the production of a press connection. The invention furthermore relates to a fluid-coolable individual line unit and to a charging cable having a charging connector.

26 Claims, 4 Drawing Sheets

(51) Int. Cl.
    *B60L 53/302*     (2019.01)
    *F16L 25/01*     (2006.01)
    *H01B 7/42*     (2006.01)
    *H01R 4/20*     (2006.01)
    *H01R 9/11*     (2006.01)
    *H01R 13/03*     (2006.01)
    *H01R 43/20*     (2006.01)

(52) U.S. Cl.
    CPC ............... *H01B 7/423* (2013.01); *H01R 4/20* (2013.01); *H01R 9/11* (2013.01); *H01R 13/03* (2013.01); *H01R 43/20* (2013.01)

(56) References Cited

U.S. PATENT DOCUMENTS

| | | | |
|---|---|---|---|
| 11,688,964 B2* | 6/2023 | Kempf | F16L 25/01 439/485 |
| 2012/0282792 A1* | 11/2012 | Schlogl | H01R 13/005 439/196 |
| 2015/0054460 A1* | 2/2015 | Epstein | B60L 58/27 320/109 |
| 2015/0217654 A1* | 8/2015 | Woo | B60L 53/18 320/109 |
| 2017/0028862 A1* | 2/2017 | Nagel | B60L 53/31 |
| 2017/0144558 A1* | 5/2017 | Remisch | B60L 53/18 |
| 2018/0075946 A1* | 3/2018 | Beimdieck | H01R 13/005 |
| 2018/0264957 A1* | 9/2018 | Fuehrer | B60L 53/16 |
| 2019/0036254 A1* | 1/2019 | Moseke | H01R 13/533 |
| 2019/0074620 A1* | 3/2019 | Moseke | B60L 53/16 |
| 2019/0109409 A1* | 4/2019 | Fuehrer | H01R 13/533 |
| 2019/0131035 A1* | 5/2019 | Führer | B60L 53/14 |
| 2019/0176653 A1* | 6/2019 | Fuehrer | B60L 53/16 |
| 2019/0217728 A1* | 7/2019 | Reber | B60L 53/18 |
| 2019/0217731 A1* | 7/2019 | Rönfanz | H01R 31/06 |
| 2019/0237218 A1* | 8/2019 | Heyne | H01B 9/006 |
| 2019/0252094 A1* | 8/2019 | Wienziers | H05K 7/2039 |
| 2019/0252095 A1* | 8/2019 | Mayer | B60L 53/302 |
| 2019/0291588 A1* | 9/2019 | Chou | B60L 53/16 |
| 2019/0315239 A1* | 10/2019 | Beimdieck | B60L 53/16 |
| 2020/0234853 A1* | 7/2020 | Lee | H01B 7/423 |
| 2020/0303093 A1* | 9/2020 | Cantz | H01R 9/11 |
| 2021/0148780 A1* | 5/2021 | Fortin | H01B 7/32 |
| 2021/0197673 A1* | 7/2021 | Espig | B60L 53/53 |
| 2021/0206280 A1* | 7/2021 | Führer | H01R 24/30 |
| 2022/0000041 A1* | 1/2022 | Knowles | A01G 9/1423 |
| 2022/0029329 A1* | 1/2022 | Kempf | H01R 9/11 |
| 2022/0144108 A1* | 5/2022 | Garcia-Ferre | H01R 13/05 |
| 2022/0234455 A1* | 7/2022 | Fuehrer | B60L 53/302 |
| 2022/0355690 A1* | 11/2022 | Linsmeier | B60K 6/40 |
| 2022/0410743 A1* | 12/2022 | Choi | B60L 53/18 |
| 2022/0410744 A1* | 12/2022 | Choi | B60L 53/18 |
| 2023/0022676 A1* | 1/2023 | Loser | B60L 53/16 |

* cited by examiner

CONNECTION ELEMENT FOR ELECTRICALLY CONNECTING A FLUID-COOLABLE INDIVIDUAL LINE, FLUID-COOLABLE INDIVIDUAL LINE UNIT, AND CHARGING CABLE

This application is a Divisional of copending application Ser. No. 17/311,156, filed on Jun. 4, 2021, which is the National Phase under 35 U.S.C. § 371 of International Application No. PCT/EP2019/082997, filed on Nov. 28, 2019, which claims the benefit under 35 U.S.C. § 119(a) to Patent Application No. 1497/18, filed in Switzerland on Dec. 5, 2018, all of which are hereby expressly incorporated by reference into the present application.

TECHNICAL FIELD

The invention relates to a connection element for electrically connecting an individual line which has a concentric conductor arrangement and a central channel for a cooling fluid. The invention furthermore relates to a fluid-coolable individual line unit for a charging cable, a charging cable having a plug connector, and a method for producing a fluid-coolable individual line unit.

PRIOR ART

Charging electrically powered vehicles currently still requires many times the time required to refuel vehicles with internal combustion engines. While internal combustion engines can be refueled in just a few minutes, the charging time for fully charging an electric vehicle at the public fast charging stations at recharging stations, which are widely used today, is still significantly more than 30 minutes. For example, the charging time of a Tesla S 70 model with a battery capacity of 70 kWh at a direct current fast charging station with a charging power of 135 kWh is approximately 0.6 h. However, the first 350 kW charging stations which transmit currents of up to 700 A at approximately 500 V are in operation. They allow batteries with a capacity of 60 kWh to be charged in about 10 minutes. However, in order for the charging cable to be able to transmit such large currents, but also for a person to grasp it well, it is necessary to actively cool the cable from approximately 200 A direct current. Otherwise, either the permissible surface temperature would be exceeded, or such a large line diameter would have to be used that it would hardly be reasonable for a person to grasp it. In addition, there would be no possibility of handling the cable properly owing to excessively high weight. Such problems exist not only with electrically driven automobiles, but also with all means of transport or transportation which draw electric energy from an electric energy store with a high capacity and which must be regularly charged via an external electric charging system. This also includes electrically operated commercial vehicles, aircraft and watercraft, for example.

Internal tests have shown that cables which have internally cooled individual lines with central cooling channels in each case are particularly suitable. Such an individual line comprises a concentric conductor arrangement which encloses the central channel, and insulation which directly encloses the conductor arrangement and is impenetrable and electrically insulating for the cooling fluid. In this case, it is particularly advantageous if the conductor arrangement can be penetrated by the cooling fluid, as a result of which the conductor arrangement is cooled directly and thus the heat produced in the conductor arrangement by the ohmic losses can be dissipated via the cooling fluid in the channel. Moreover, it is advantageous for the stability of the individual line if an open support structure with a longitudinal extent which is directly enclosed by the conductor arrangement along the longitudinal extent is arranged in the channel.

However, the electrical connection of such cables or of the individual lines is difficult and expensive, both on the plug side and on the charging station side. In particular, there is the risk of damaging the central cooling channel when connecting the individual lines to the plug as well as to the charging station.

DE 10 2016 117 261 A1 (Harting Automotive GmbH) describes a connection unit for connecting a fluid-cooled electric cable which has a central coolant line in cross section. In particular, this is a charging cable for electric cars. Individual copper wires are positioned around the central coolant line and are surrounded by a liquid-tight film. Hollow buffer elements rest on this film and are surrounded by a solid cable sheath. DE 10 2016 117 261 A1 discloses a first connection element, which is provided for connecting a contact pin of a car charging plug connector to such a cable. In the case of the cylindrical connection element, a hollow cylinder tapering forward projects in the form of a hollow needle. The outlet opening of the hollow cylinder is pushed into the liquid line, and as a result there is a fluid connection between the central liquid line and the lateral openings in the main cylinder. DE 10 2016 117 261 also describes a second connection element, which is provided for connecting the cable to a charging station. This comprises a contact element, likewise with a hollow cylinder, which is pushed into the liquid line of the cable. The liquid in the hollow cylinder is conveyed outward in the contact element into a fluid connection piece. Via this, the fluid heated in the charging plug connector can be discharged to the outside. An additional crimp barrel is required for electric contact. In this case, the contact element is connected to the electric cable within a housing.

A charging cable must not only transmit very high currents but must also be very robust since it is moved during each charging process. Moreover, it is subjected to additional mechanical stress when the charging plug connector is inserted into the automobile as well as when it is unplugged. Finally, the charging cable must also be able to withstand falls during improper handling. At the same time, the charging cable must ensure a safe electrical connection and a high flow rate of the cooling fluid owing to the high currents to be transmitted. Finally, it is necessary for the connection of the cables to be inexpensive and easy to produce. The prior art achieves the object only to a limited extent. DE 10 2016 117 261 requires an additional crimp barrel to produce the electrical connection.

DESCRIPTION OF THE INVENTION

It is the object of the invention to provide a connection element which belongs to the technical field mentioned at the outset and which makes possible a mechanically robust and at the same time inexpensive connection to a fluid-cooled conductor which has a central fluid channel surrounded by a concentric conductor.

In addition to all these requirements, the connection element must enable the charging cable to reliably transmit high currents. In particular, currents of more than 700 A are desired in DC charging stations.

The object is achieved by the features of claim 1. According to the invention, the connection element for electrically connecting an individual line which has a concentric conductor arrangement and a central channel for a cooling fluid comprises an electrically conductive housing having a sleeve-shaped compression section which is suitable for producing a compression joint with the concentric conductor arrangement. Here, the electrically conductive housing has an internal cooling channel having a connection opening for an external cooling line, said cooling channel leading into a space surrounded by the sleeve-shaped compression section. In addition, the connection element comprises a counterpressure element, which can lie at least partially in the space surrounded by the sleeve-shaped compression section. The counterpressure element is furthermore configured to support the concentric conductor arrangement on the inner side thereof when the sleeve-shaped compression section is compressed during the production of a compression joint. In this case, it is designed to be fluid-permeable in the pressed state in order to ensure a fluid connection through the counterpressure element.

The connection element makes it possible to enter into a very stable compression joint with the conductor arrangement of the cable, which in addition has a large surface area since contact on the outer circumference of the conductor arrangement is ensured. Owing to the counterpressure element, very high surface pressures can be produced for the production of the press contact, and at the same time there is no risk of closing the central cooling channel since the counterpressure element is designed in such a way that it remains fluid-permeable at the pressure provided. Since the compression sleeve is at the same time a component of the housing of the connection element, not only a further electrical interface but also a thermal interface is dispensed with. This ensures good heat transfer between the compression sleeve and the internal cooling channel. Therefore, the compression sleeve is also well cooled. Since the compression sleeve is a component of the housing, the connection element permits a mechanically robust connection between the individual line and the connection element.

A compression joint is a joint between two parts which makes use of the friction between these two parts. However, pressing can also produce a combined frictional and positive joint. Similar to crimping, the positive fit can be achieved here by deformation of at least one of the pressed parts. For example, one part may have a structure which presses into the other part during the pressing process. In the context of this invention, a compression joint is therefore also understood to mean a combined frictional and positive joint.

A concentric conductor arrangement in the sense of this application comprises a conductor braid and/or individual conductors which are arranged around a channel and are in electric contact with one another. A concentric conductor arrangement, the inner layer of which is formed by a conductor braid, is particularly well suited. Such a conductor braid can already form a channel on its own. However, the inside diameter of such a hollow cylinder formed by a conductor braid changes when it is stretched or compressed along its longitudinal axis. In order to prevent the conductor braid from forming a channel with changing and possibly also very small inside diameters and at the same time to ensure the flexibility of the cable, an open support structure is advantageously arranged in the central channel. Reliable cooling can thus be achieved. The support structure ensures that the inside diameter always has a certain minimum value. A conductor braid is a product which is produced by crossing the conductors over and under in a regular pattern. In this arrangement, the conductors can intersect at an angle of 90° or at some other angle. The braid can form a flat surface or mat, i.e. it can expand as far as desired in two dimensions, or it can be in a cylinder-like shape which expands as far as desired in only one dimension and is restricted in the other two spatial dimensions. Preferably, the conductors cross at an angle not equal to 90° and the braid forms a cylinder-like shape.

An open support structure is an elongate structure whose convex envelope has the shape of a cylinder, wherein at least one continuous channel, i.e. a channel which is not interrupted by the structure, runs along and in the interior of the convex envelope.

Here and in the following, what is meant by "directly enclose" is, in particular, that no further layers or structures are provided between the enclosed and the enclosing feature. In this context, cavities and/or cooling fluid should not be regarded as a layer or structure.

Here and in the following, "enclose" means, in particular, that there may well be further layers or structures between the enclosed and the enclosing feature, but these do not necessarily have to be present.

For the purposes of this invention, an electrically insulating material is, in particular, one that has a specific resistance of more than $10^5$ Ωm, preferably more than $10^{10}$ Ωm. In particular, the invention can use ethylene-propylene-diene rubber (EPDM) and/or thermoplastic elastomers (TPE) as insulating materials.

A cooling fluid may be a liquid or a gas. By virtue of its high heat capacity, water is particularly suitable as a cooling liquid. It may contain additives such as anticorrosive agents or antifreeze agents.

The insulation of the individual lines is preferably somewhat flexible, so that it can easily expand during operation under the pressure of the cooling fluid. Under the operating pressure of the cooling fluid, this expansion, measured at the outer radius of the insulation, is in particular not more than 10% of the outer radius, which is measured when there is no cooling fluid in the individual line. In particular, the insulation can consist of EPDM or TPE.

In particular, the insulation of the individual lines can be fiber-reinforced. For this purpose, fibers having a high modulus of elasticity and good temperature stability can be embedded in the insulation and/or bear against the outside thereof. The modulus of elasticity of the fibers should preferably be higher than 50 GPa at 20° C. and should be temperature-stable up to above 100° C. Examples of suitable fibers are aramid fibers, hemp fibers and polyethylene fibers. In contrast to conventional electric cables, the insulation of the individual lines is also exposed to a possibly high internal pressure by the cooling fluid. The fiber reinforcement absorbs some of this internal pressure and thus increases the reliability of the insulation.

The individual line preferably comprises a support structure with a longitudinal extent which is arranged in the central channel.

A charging cable preferably comprises a first and a second fluid-coolable individual line and a common protective sheath. In a preferred embodiment, the charging cable comprises at least one hose made of a fluidtight material surrounded by the common protective sheath, wherein a cooling fluid passed through one of the central channels of the two fluid-coolable individual lines can be returned in the opposite direction through the at least one hose. The charging cable particularly preferably comprises two hoses made of a fluidtight material surrounded by the common protective sheath, wherein a cooling fluid passed through the central channels of the two fluid-coolable individual line units can be returned in the opposite direction through the two hoses. The charging cable preferably also comprises signal lines. The charging cable preferably comprises a ground conductor. The ground conductor can be designed as a conductor with its own insulation surrounded by the common protective sheath or can be formed in a manner distributed in the protective sheath. If it is located in the protective sheath, it may be a conductor braid or individual wires or thin strands arranged adjacent to one another. Several groups of such individual wires or thin strands arranged adjacent to one another can be separated from one another by sections of protective sheath material which do not contain any conductors. The charging cable preferably comprises both: a ground conductor with its own insulation surrounded by the common protective sheath and a second ground conductor formed in a manner distributed in the protective sheath.

In a preferred embodiment, the charging cable comprises two fluid-coolable individual lines, the central cooling fluid channel of which is supported in each case by a support structure in the form of a wire spiral. Each of the individual lines is surrounded by fiber-reinforced insulation. This charging cable furthermore comprises two hoses, a first ground conductor with a round cross section surrounded by its own insulation, and four groups of signal cables each comprising three signal cables surrounded by a common signal cable sheath. The two individual lines, the first ground conductor, the two hoses and the four groups of signal cables are located within a common protective sheath. The protective sheath comprises four groups of individual conductors arranged adjacent to one another, which are separated from one another by sections of sheath material without embedded individual conductors. The individual conductors in the protective sheath also act as ground conductors. This preferred embodiment of a charging cable represents a particularly good compromise in terms of override strength, flexibility, weight and safety.

In a preferred embodiment, the counterpressure element has a substantially cylindrical outer contour.

Such a shape is particularly simple to produce and can also support the concentric conductor, which in most cases has a circular cross section on its inside, uniformly with its cylindrical outer contour over the entire circumference. In the case of elliptical cross sections, an elliptical outer contour of the counterpressure element is preferred. However, it is also possible to use counterpressure elements with an open outer contour. Such counterpressure elements can, on the one hand, have a convex envelope in the form of a cylinder or else an ellipse. Examples of such shapes are, for example, coil springs. On the other hand, such counterpressure elements with open outer contours can also have cross-shaped or star-shaped cross-sectional profiles. In the latter case, the convex envelope is a cylinder with a rectangle or a polygon as the base surface.

In one embodiment, the counterpressure element is hollow-cylindrical and fluid connection is ensured by a central through-opening. This shape is not only particularly simple to produce, but also has good stability. In addition, the central arrangement makes it possible to achieve a good flow rate with a small pressure drop. The through-opening can be achieved easily by a through-hole. The inside diameter of the central opening is preferably greater than 2 mm, 3 mm, 4 mm or 5 mm. However, it is also possible for the counterpressure element to comprise a plurality of through-openings.

In a preferred embodiment, the counterpressure element is arranged on the housing. The counterpressure element can, for example, be screwed or welded to the housing. This arrangement permits particularly simple assembly since the concentric conductor can be pushed into the annular recess formed by the gap between the compression section and the counterpressure element prior to pressing. At the same time, the mechanical strength is improved by the additional connection of the counterpressure element to the housing. If the counterpressure element is produced from an electrically conductive material, the counterpressure element furthermore reduces the electrical resistance of the electrical connection between the individual line to be connected and the connection element.

However, the counterpressure element can also be produced as a separate element. In this case, it can be pushed into the interior of the conductor arrangement or into the central channel of the individual line for assembly prior to pressing, before the compression joint is produced. As a result, a very simple configuration of the connection element is possible, which is very simple to manufacture. In addition, a material with a particularly high mechanical strength can be used. As a result, high pressing forces can be achieved and, at the same time, fluid permeability in the direction of the central channel can be maintained even with relatively small wall thicknesses. As a result, the central opening of the counterpressure element can be implemented with a larger inside diameter, and thus a better flow rate can be achieved. Steels are particularly suitable as a material for the production of a separate counterpressure element. Depending on the cooling fluid used or the anticorrosive agents used, it is advantageous to use stainless steel alloys or to coat the pressure element.

As a particular preference, the counterpressure element is formed in one piece or as a single part with the electrically conductive housing. One piece means that the counterpressure element and the electrically conductive housing are formed from a continuous piece. As a result, the abovementioned advantages of simple assembly and reduced electrical resistance or improved electric contact are taken over. Depending on the material used, the mechanical strength is improved.

In another preferred embodiment, the counterpressure element is dimensioned in such a way that, as it is introduced, it can take along a support structure which is arranged in the central channel and which is directly enclosed by the conductor arrangement along the longitudinal extent.

In the context of this application, the term introduction is used as a generic term for the terms pushing in and screwing in. While pushing in essentially describes a translational relative movement between two bodies, a relative rotary movement is superimposed on the translational relative movement during screwing in, the rotary movement taking place about an axis which is defined by the translational displacement line. One example of such a movement is screwing a screw into a thread.

However, embodiments are also possible in which the counterpressure element is mounted in a different way in the central channel, such that the conductor arrangement at least partially surrounds it. For example, the conductor braid can be unbraided in the region of the stripped section in order to mount the counterpressure element.

If an open support structure is present in the central channel, at least the part of the support structure facing the connection element can be displaced in the direction of the cable end facing away from the connection element by exerting a force on the support structure by means of the counterpressure element. Depending on the design, the support structure is compressed in the longitudinal direction.

The shape of the counterpressure element must be configured in such a way that it can exert this force on the support structure. In particular, the end face of the counterpressure element should be configured in such a way that it does not wedge between the support structure and the conductor arrangement.

In a preferred embodiment, the counterpressure element has a profile on its outer casing, which profile permits a positive connection to the conductor arrangement during the production of the compression joint.

The profile preferably has ribs which run substantially perpendicularly to the connection direction of the individual line. In the case of a hollow-cylindrical shape, the outer casing is formed by the outer circumferential surface of the hollow cylinder, for example. The profile achieves an improved positive connection between the counterpressure element and the conductor arrangement since the profile can be pressed into the conductor arrangement and into the inner circumferential surface of the compression sleeve. The structure can be a knurl known to the person skilled in the art, in particular a circular knurl or a cross knurl. A profile with substantially vertical ribs can also have the structure of a screw thread, for example. This simplifies the screwing of the counterpressure element into the central channel. The vertical course of the ribs improves the ability of the compression joint to transmit force in the axial pulling direction.

The housing of the connection element is preferably produced from copper or a copper-containing alloy. Good electrical and thermal conductivity can thereby be achieved. Copper- and copper-containing alloys are also well suited for pressing. However, it is also possible to use other materials, e.g. brass. The connection element is preferably also coated, in particular silver-, gold- or nickel-coated. The coating can also be an electrolytic coating.

In another preferred embodiment, the connection element comprises a contact part, wherein the contact part preferably has a female socket which is suitable for use in a charging plug connector for an electric vehicle. The charging plug connector may be a DC, an AC, or a combined charging plug connector.

It is preferably suitable for use in a DC charging plug connector, an AC charging plug connector and/or a combined charging plug connector for an electric vehicle.

In particular, an electric vehicle can be an electrically driven automobile or road-based commercial vehicle. However, it can also be any means of transport or transportation which draws the electric energy from an electric energy store and, in particular, must be regularly charged via an external electric charging system. In particular, it can be a rail vehicle, an aircraft or a watercraft.

A contact part is formed by a plug pin of a charging plug connector. This can be designed as a male pin or as a female socket. For vehicle connections standardized according to IEC 62196-3, female sockets are provided for the DC lines.

Through the internal cooling line, not only the connection element but also the contact part can be cooled.

In a preferred embodiment, the contact part is coated with a wear-resistant, electrically highly conductive coating, wherein the coating is, in particular, a silver, gold or nickel-platinum coating. These coatings permit very good electrical contact. In addition, the coating improves the corrosion resistance of the contact part. For the purposes of this application, highly conductive is understood to mean electrical conductivity of more than $5 \cdot 10^6$ S/m, in particular of more than $15 \cdot 10^6$ S/m or $25 \cdot 10^6$ S/m.

In a preferred embodiment, the conductive contact part is detachably connected to the housing of the connection element.

This makes it possible to easily replace the contact part, which is subject to a particularly high stress. On the one hand, the contact part is subjected to constant mechanical stress and thus to mechanical wear as a result of the insertion and removal operations. On the other hand, it is exposed to environmental influences since a plug housing usually does not completely cover the contact part.

There is a particular preference here that the conductive contact part can be connected to the housing by means of a screw connection, wherein the contact part preferably has an internal thread, which can be screwed to an external thread of the contact part. In addition, it is advantageous if a screw locking device is arranged between the housing and the contact part. Such a screw locking device can comprise a spring ring or a spring washer. Such screw locking devices are known to those skilled in the art. The screw connection makes it particularly easy to change the contact part.

Instead of an external thread on the contact part, the contact part can also have a through-hole with an internal thread. A screw connection is then possible by means of a threaded pin or a threaded bolt.

In another embodiment, the internal cooling channel opens axially into the space surrounded by the sleeve-shaped compression section, preferably centrally with respect to the inner circumferential surface of the compression section.

It is furthermore preferred that the connection opening is arranged perpendicularly to a connection direction of the individual line and preferably has an internal thread. In this case, the connection direction is determined by the alignment of the compression sleeve section. The perpendicular arrangement makes it a simple matter to establish a fluid connection between adjacent individual lines in a plug connector. This makes it possible for the cooling liquid supplied in a first individual conductor to be returned in a second individual conductor. Likewise, the perpendicular arrangement allows connection in a particularly simple and space-saving manner to a separate cooling hose, via which the cooling liquid is to be returned.

In a particular embodiment, the connection element has two sleeve-shaped or more compression sections, which are each suitable for producing a compression joint with a concentric conductor arrangement, and the internal channel in each case opens into the two or more sleeve-shaped compression sections. In this case, one of these two or more openings in which the internal channel opens into the space surrounded by the respective sleeve-shaped compression section is to be understood as a connection opening for an external cooling line, which in this case is provided by an individual line. In addition, however, it is also possible to provide one further or more external connection openings for the internal cooling channel.

A fluid-coolable individual line unit for a charging cable comprises a first inventive connection element and an individual line having a first and a second end. In this case, the individual line comprises a concentric conductor arrangement and insulation, wherein there is at least one central channel for a cooling fluid, which is enclosed by the conductor arrangement, and wherein the insulation directly encloses the conductor arrangement and is impenetrable and electrically insulating for the cooling fluid. In addition, the individual line has a first stripped end piece at its first end, on which the insulation is axially set back with respect to the conductor arrangement, wherein the inner circumferential surface of the compression section of the first connection element is in a radial compression joint with the conductor arrangement on the stripped end piece, as a result of which there is an electrical connection between the connection element and the concentric conductor arrangement. Furthermore, a counterpressure element is arranged in the central channel so that it lies at least partially in the space surrounded by the sleeve-shaped compression section, and supports the concentric conductor arrangement on the inside thereof and, at the same time, is in a compression joint with the concentric conductor arrangement. In this case, the counterpressure element permits a fluid connection through the central channel of the individual line between the internal cooling channel of the first connection element and the second end of the individual line.

The counterpressure element permits fluid connection through its fluid permeability in the pressed state, for example through a central opening.

Such a fluid-coolable individual line unit has the advantages which have been discussed above in the context of the connection element. It makes it possible to cool the conductor arrangement in the individual line, i.e. directly at the location at which heat is produced by ohmic losses, as well as to cool the connection element.

The charging cable can be either a DC charging cable, an AC charging cable or a combined DC and AC charging cable.

In a preferred embodiment of the fluid-coolable individual line unit, the individual line comprises a support structure, which is arranged in the central channel and has a longitudinal extent which is directly enclosed by the conductor arrangement along the longitudinal extent, wherein the support structure is arranged between the counterpressure element and the second end of the individual line.

In another preferred embodiment, the conductor arrangement can be penetrated by the cooling fluid in the central channel.

The conductor braid may be permeable to the cooling fluid, even though the conductors themselves are not, since there are gaps between the conductors in the braid. Such a braid with gaps, which can be penetrated by the cooling fluid, has the advantage that the contact surface between the cooling fluid and the conductors can be increased significantly and thus the heat can be efficiently dissipated to the cooling fluid. In addition, a braid with gaps is more flexible, which increases the flexibility of the individual line as a whole.

In one embodiment, the fluid-coolable individual line unit comprises a sealing means which produces a fluidtight connection between the sleeve-shaped compression section and the insulation of the individual line, wherein the sealing means preferably comprises a flexible hose, in particular a shrink-on hose. The sealing means can also comprise an adhesive tape, in particular a sealing adhesive tape and/or a silicone compound or a silicone tape.

Moreover, the sealing means can be additionally fixed to the electrically conductive housing by a clamp and/or to the insulation of the individual line by a clamp. The sealing means can also comprise a flexible tube element, for example as an alternative to a flexible hose.

The sealing means prevents the cooling fluid from escaping. Therefore, the conductor arrangement does not have to be fluidtight in itself, optionally even after pressing, which reduces the requirements on the compression joint. By virtue of the sleeve shape of the compression section into which the individual line projects, the sealing means can be of very simple design. No additional housing is required. The fluid-coolable individual line unit can therefore also be designed to be very compact and robust in the region of the connection element.

In another preferred embodiment of the fluid-coolable individual line unit, a second connection element according to the invention is arranged at the second end of the individual line, wherein the second connection element preferably comprises a means for the electrical connection of the individual line to an electric charging station, wherein the charging station is preferably a charging station for electric vehicles. The means for electrical connection is preferably provided for connecting the fluid-coolable individual line to a power connection and/or to a terminal or plug system of the electric charging station. The power connection comprises a busbar, for example.

A means for the electrical connection to the charging station can be, for example, a contact part in the form of a plug pin or a plug socket. However, it can also be a fastening element, such as a screw thread, a bore or a cable lug-shaped connection element.

An inventive charging cable with a charging plug connector comprises a first and a second inventive fluid-coolable individual line unit and a common protective sheath, wherein the charging plug connector comprises a charging plug housing, preferably a charging plug housing according to IEC 62196-3. The charging cable is preferably a DC charging cable in which two DC connection pins of the charging plug connector are implemented by the first connection elements of the two individual lines.

In a preferred embodiment, the charging cable comprises at least one hose made of a fluidtight material surrounded by the common protective sheath and connected to at least one of the external cooling connections of the two first connection elements, wherein a cooling fluid passed through one of the central channels of the two fluid-coolable individual line units can be returned in the opposite direction through the at least one hose.

As a particular preference, the charging cable comprises two hoses, which are each connected to one of the external cooling connections of the two first connection elements, wherein a cooling fluid passed through the central channels of the two fluid-coolable individual line units can be returned in the opposite direction through the two hoses.

A charging cable of this kind can be produced in a particularly simple manner by means of the connection elements according to the invention and permits a compact construction.

A method according to the invention for producing an inventive fluid-coolable individual line unit comprises the following steps:

a) providing an individual line, which comprises a concentric conductor arrangement and insulation, wherein there is in the individual line at least one central channel for a cooling fluid, which is enclosed by the conductor arrangement, and wherein the insulation directly encloses the conductor arrangement and is impenetrable and electrically insulating for the cooling fluid, b) providing an inventive connection element, c) stripping the individual line at a first end, with the result that the first end has a first stripped end piece, on which the insulation is axially set back with respect to the conductor arrangement, d) introducing, in particular screwing, the counterpressure element into the central channel of the individual line, e) pushing the sleeve-shaped compression section of the connection element onto the first stripped end piece, f) wherein the counterpressure element is introduced into the conductor arrangement to such an extent that, after the sleeve-shaped compression section has been pushed on, the conductor arrangement and the sleeve-shaped compression section completely enclose the counterpressure element, at least in a partial section, and g) producing a radial compression joint between the compression section and the conductor arrangement by means of a pressing tool in the region of the partial section, with the result that the counterpressure element supports the conductor arrangement toward the inside during the pressing operation.

In another embodiment of the method, the individual line furthermore comprises a support structure having a longitudinal extent, wherein the support structure is arranged in the central channel and is directly enclosed by the conductor arrangement along the longitudinal extent. In accordance with this embodiment of the method, an optionally present longitudinal section of the support structure is pushed back in the longitudinal direction as the counterpressure element is introduced.

In another embodiment of the method, the connection element is a connection element in which the counterpressure element is arranged on the housing and/or a counterpressure element which is formed in one piece with the housing. In this embodiment of the method, the pushing on of the sleeve-shaped compression section of the connection element and the introduction of the counterpressure element take place simultaneously.

Such a method can be carried out very efficiently since the separate working step of introducing the counterpressure element into the central channel is eliminated.

There is furthermore a preference for a method in which the pressing is carried out with a pressing tool which has a two-part hexagonal die. Hexagonal pressing makes it possible to provide a robust compression joint. However, other compression joints by means of a press die are also possible, such as, for example, a triangular, square or pentagonal or round or oval compression joint. The pressing can also be carried out, inter alia, by ball pressing and induction pressing.

As a particular preference, the pressing takes place at two different positions offset axially with respect to the compression sleeve. Pressing at two positions offset axially with respect to one another reduces the electrical connection resistance and also increases the mechanical robustness and reliability of the compression joint. However, it is also possible to reduce the electrical connection resistance over a relatively long pressing location. The pressing of the two positions offset axially with respect to one another preferably takes place sequentially.

The pressing is preferably carried out with hydraulic pressing tools. The pressing forces are, for example, between 3-10 kN, preferably between 5-6 kN.

Further advantageous embodiments and combinations of features of the invention will become apparent from the following detailed description and the patent claims in their entirety.

BRIEF DESCRIPTION OF THE DRAWINGS

In the drawings used to explain the exemplary embodiment:

FIG. 1b shows a sectional view of the housing of the connection element according to FIG. 1a;

FIG. 1c shows a sectional view of the counterpressure element according to FIG. 1a;

FIG. 1d shows a sectional view of the contact part according to FIG. 1a;

In principle, identical parts are provided in the figures with the same reference signs.

Ways of Carrying Out The Invention

Figure 1A:
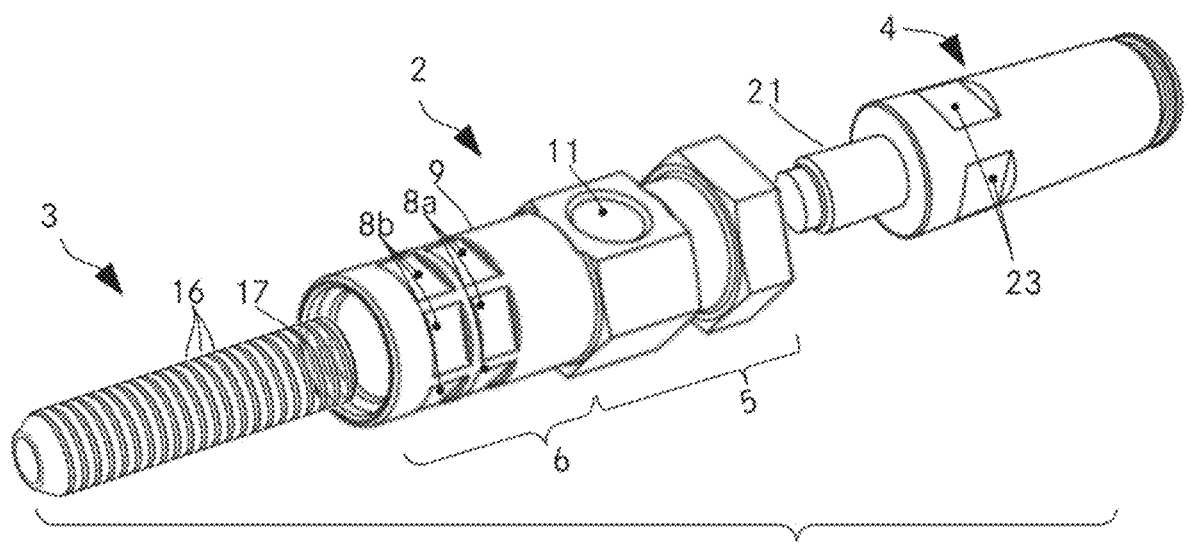
FIG. 1a shows a perspective view of a connection element having a contact part and a separate counterpressure element.
Figure 1B:
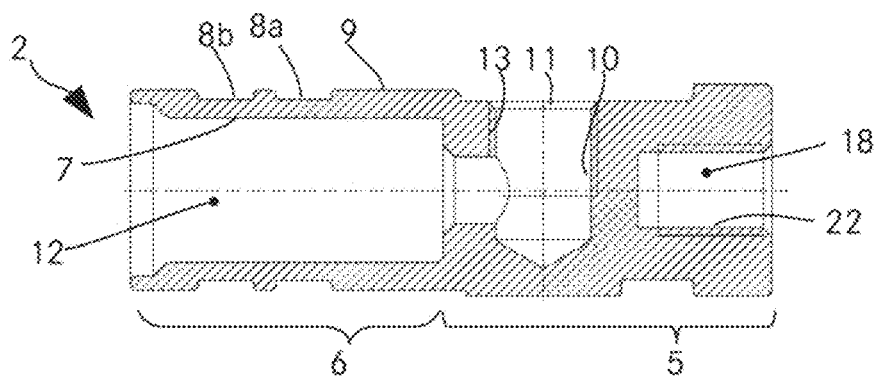
Figure 1C:
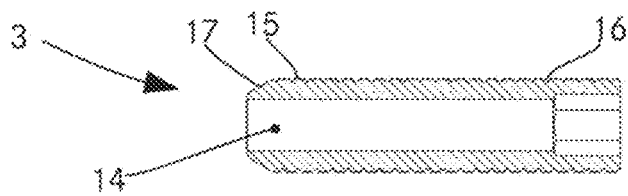
Figure 1D:
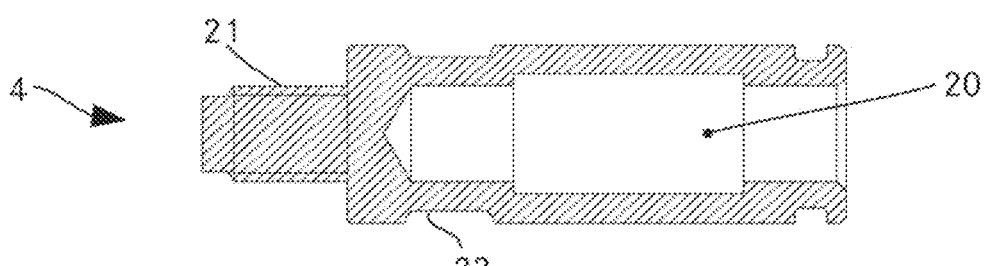

FIGS. 1a-d show a first embodiment of the inventive connection element 1 for connecting an individual line having a concentric conductor arrangement and a central channel for a cooling fluid. The connection element 1 comprises an electrically conductive housing 2, a counterpressure element 3 and a contact part 4. FIG. 1a shows a perspective illustration of the various non-assembled individual components. The individual parts of the connection element are each shown in axial section in FIGS. 1b-1d: the electrically conductive housing 2 is shown in FIG. 1b, the counterpressure element in FIG. 1c and the contact part in FIG. 1d.

The electrically conductive housing 2 has a substantially cylindrical shape and is preferably produced from copper or a copper alloy. As an axial extension of a main section 5, it comprises a sleeve-shaped compression section 6. In the context of this application, this sleeve-shaped compression section is also referred to as a compression sleeve. This has a substantially constant wall thickness, for example a 2.5 mm wall thickness, before pressing. Only toward the open end is the wall thickness of the compression section tapered outwards at its inner circumferential surface 7, thereby simplifying the introduction of the concentric conductor arrangement of the individual line to be connected. In addition, owing to the larger inside diameter in this region, it is possible to partially accommodate the insulation of the individual conductor to be connected, thereby simplifying the sealing of the individual line from the outside. FIGS. 1a and 1b show the shape of the housing 2 after pressing. Therefore, the press indentations 8a and 8b (shown in greatly simplified form) on the outer circumferential surface 9 of the compression section are also shown, these being produced by the pressing operation in two different axial positions. The total of six press indentations 8a arranged radially on the outer circumferential surface 9 result from a first pressing operation with a two-part hexagonal pressing tool, and the six further press indentations 8b arranged radially on the outer circumferential surface 9 result from a second pressing operation. Only three of the total of six press indentations 8a, 8b are visible in FIG. 1a. The electrical housing 2 comprises an internal cooling channel 10 having a connection opening 11 arranged radially in the main section 5 of the cylindrical housing 6. The connection opening 11 is thus arranged perpendicularly to the compression sleeve axis or to the connection direction of the individual line. The internal cooling channel 10 opens axially and centrally into the space 12 surrounded by the sleeve-shaped compression section 6. The connection opening 11 has an internal thread 13, on which a hose connection element can be mounted or screwed.

The counterpressure element 3 has a substantially hollow-cylindrical shape. It is produced from a threaded pin made of stainless steel. The inside diameter of the central through-opening 14 of the counter-pressure element 3 is, for example, approximately 5 mm and the wall thickness of the hollow cylinder is, for example, approximately 2 mm. The dimensions must be selected in such a way that sufficient pressure resistance is ensured during pressing and the central through-opening is kept open even after pressing. On the outer circumferential surface 15, the counterpressure element has a structure which is formed by a helically formed groove 16 in the outer circumferential surface 15. At the front end, the outer circumferential surface 15 of the counterpressure element 3 has a chamfer 17, which simplifies the introduction of the counterpressure element 3 into the concentric conductor arrangement of the individual line.

The contact part 4 is produced from a copper-containing alloy. However, it can also be produced from other electrically highly conductive materials, in particular from electrically highly conductive alloys. The contact part of this exemplary embodiment is silver-coated. However, other wear-resistant, highly conductive compounds, such as gold and nickel-platinum coatings, are also suitable. The contact part forms a female socket 20 for mating with a pin-shaped contact. At the end opposite the socket 20, the contact part comprises a threaded bolt with an external thread 21. This is provided for screwing to the main section 5 of the housing 2. For this purpose, the main section comprises a blind hole 18 with an internal thread 22 on the side facing away from the compression section 6. For securing the screw connection, a spring ring (not shown) is used as screw locking device between the housing 2 and the contact part 4. A square profile 23 arranged on the contact part makes it possible to screw on the contact part 4 with a double open-end wrench. In order to prevent rotation of the housing 2 in a plug connector housing (not shown in FIG. 1a), the housing 2 has a hexagonal profile, which can be paired with a corresponding hexagonal recess in the plug connector housing.

Figure 2A:
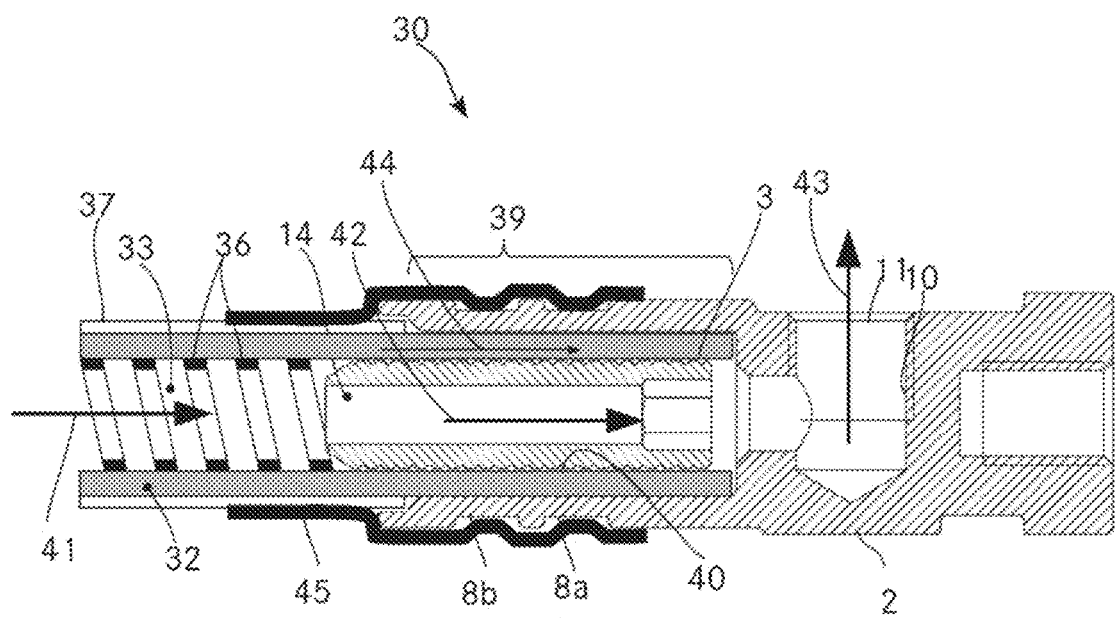
FIG. 2a shows a detail of an axial section of a first embodiment of the inventive fluid-coolable individual line unit, which comprises a connection element according to FIGS. 1a-1d.
Figure 2B:
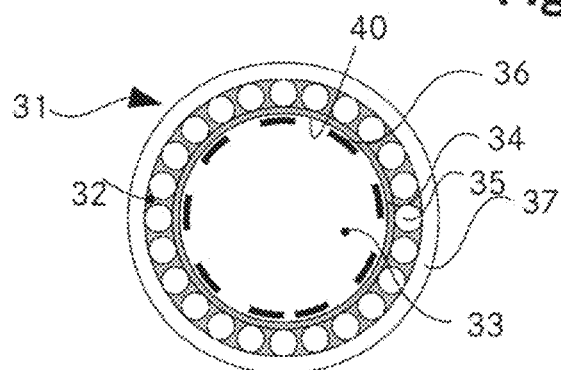
FIG. 2b shows a cross section through the individual line of the fluid-coolable individual line unit according to FIG. 2b.
Figure 2C:
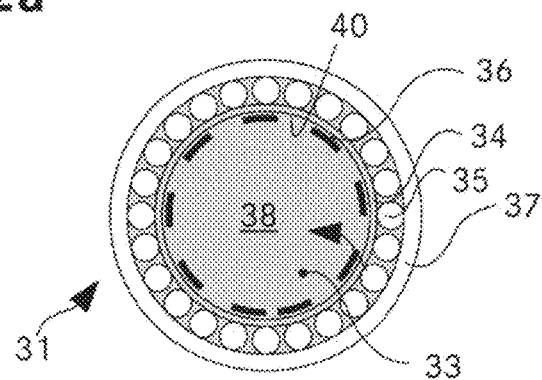
FIG. 2c shows the distribution of the cooling fluid in the individual line of FIG. 2b.

FIGS. 2a-c show a first embodiment of the inventive fluid-coolable individual line unit 30. FIG. 2a shows a detail of fluid-coolable individual line unit 30. This embodiment of the fluid-coolable individual line unit 30 comprises a connection element 1 of the kind shown in FIGS. 1a-1d, as well as an individual line 31 having a concentric conductor arrangement 32 and a central channel 33.

However, FIG. 2a does not show the contact part 4 of the connection element 1 but only the components which are directly required for the connection of the individual line, namely the electrically conductive housing 2 with the sleeve-shaped compression section 6 and the counterpressure element 3. The partial view 2a furthermore shows a stripped end of the fluid-coolable individual line 31 in longitudinal section.

FIG. 2b schematically shows a cross section of the individual line 31 for a region in which the individual line 31 is not stripped of insulation. In FIG. 2b, the region in which the conductor arrangement 32 is arranged has a gray background. It comprises a conductor braid 34 (only visible in FIGS. 2b and 2c but not in FIG. 2a) and stranded conductors 35 (likewise only visible in FIGS. 2b and 2c, not in FIG. 2a) arranged on the conductor braid 34. In the central channel 33, which is enclosed by the conductor arrangement or by the conductor braid 34, a helix 36 is arranged as a support structure, wherein the conductor braid 34 directly encloses the helix 36 in this case. The stranded conductors 35 rest on the conductor braid 34. The conductor braid 34 and the stranded conductors 35 are in electric contact with one another and jointly conduct the current which flows through the individual line 31. The stranded conductors 35 are directly enclosed by insulation 37. The central channel 33, in which the helix 36 is also located, is bounded by the conductor braid 34.

However, this boundary is not sealed against cooling fluid, and therefore the cooling fluid 38 can spread in the radial direction as far as the insulation 37. FIG. 2c shows the distribution of the cooling fluid 38 in the individual line 31. The cooling fluid 38 is shown in gray. Starting from the channel 33, it is distributed through the conductor braid 34 between the stranded conductors 35 as far as the insulation 37. The insulation 37 is fluidtight. The conductor braid 34 consists of many conductor wires and leaves free spaces between at least some of these conductors. The stranded conductors 35 themselves are as a rule fluid-impermeable, but the fluid is distributed in the free spaces. Finally, it achieves the distribution shown, in which substantially all the stranded conductors 35 are in contact with the fluid over a large part of their surface and thus very good cooling is achieved.

As can be seen from FIG. 2a, the insulation 37 is set back with respect to the conductor arrangement 32 at the stripped end 39 of the individual line. In the region of this stripped end 39, the counterpressure element 3 is arranged within the central channel 33. The stripped section 39 of the conductor arrangement 32 is arranged in the space 12 surrounded by the sleeve-shaped compression section 6 (see FIG. 1a). In this case, the counterpressure element 3 is arranged in the central channel 33 in such a way that it lies for the most part in the space 12 surrounded by the sleeve-shaped compression section 6. At the same time, the counterpressure element 3 supports the concentric conductor arrangement 32 on its inner side 40 in the axial region in which the conductor arrangement 32 is in a compression joint with the compression section 6. In this exemplary embodiment, the inner side 40 of the concentric conductor arrangement 32 is formed by the inner circumferential surface of the conductor braid 34, which is illustrated in FIGS. 2b and 2c but not in FIG. 2a. Said axial region is the region in which pressing of the compression sleeve section 6 with the concentric conductor arrangement 32 has been carried out by two pressing operations in different positions offset axially with respect to one another. The axial press indentations 8a, 8b are shown schematically in FIG. 2a. When the counterpressure element 3 was introduced, the helix 36 was compressed in the direction of the opposite end (not shown) of the individual line in such a way that the helix 36 lies between the counterpressure element 3 and the opposite end of the individual line 31.

In FIG. 2a, a possible flow direction of the cooling fluid is shown by means of arrows 41-43. In the illustrated case, the cooling fluid flows from the individual line end (not shown) opposite the connection element 1, through the central channel 33 of the individual line 31 and through the through-opening 14 of the counterpressure element into the internal cooling channel 10 of the connection element and from there to the connection opening 11. Although the conductor arrangement 32 is compressed in the stripped region 39 by the pressing action, the conductor arrangement 32 can still have fluid permeability there, depending on the degree of compression. Likewise, there is no appreciable compression directly at the outer edge of the compression section. Liquid could therefore escape to the outside between the insulation 37 and the compression section 6 without any countermeasure. Depending on the degree of compression, a small amount of liquid can also flow past the counterpressure element 3 through the conductor arrangement 32, as indicated by the arrow 44. The sealing hose 45 serves as a sealing means in order to prevent an unwanted escape of the cooling fluid 38 through the gap between the insulation and the compression section 6. A shrink-on hose is particularly suitable as sealing hose 45. In addition to the sealing hose, a sealing adhesive tape and silicone are advantageously used for sealing. However, it would also be possible to use other sealing means, such as a sealing ring or a hose fastened with clamps. The flow direction indicated by the arrows 41-44 can of course also be reversed.

Figure 3:
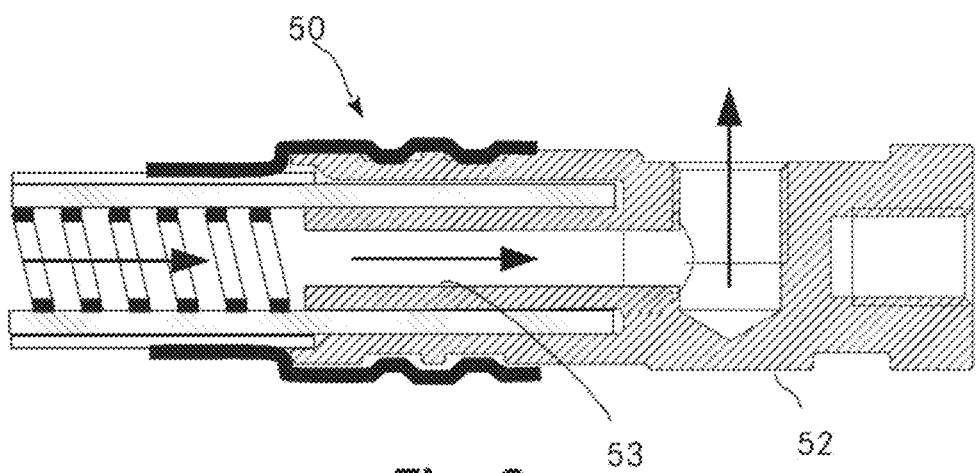
FIG. 3 shows a detail of an axial section of a second embodiment of the inventive fluid-coolable individual line unit.

FIG. 3 shows a second embodiment of the inventive fluid-coolable individual line unit 50. It shows a detail of an axial section through the fluid-coolable individual line unit 50. This embodiment largely corresponds to the first embodiment of the individual line unit 30. In contrast to the first embodiment, in this embodiment the counterpressure element 53 is formed in one piece with the electrically conductive housing 52. It is also possible to provide a separate counterpressure element 53 and to arrange it on the housing 52. A separate counterpressure element makes it possible to use another material, in particular a material with a higher strength and/or stiffness. This makes it possible, for example, to select the diameter of the through-opening of the counterpressure element to be larger and thus to achieve a higher flow rate.

Figure 4:
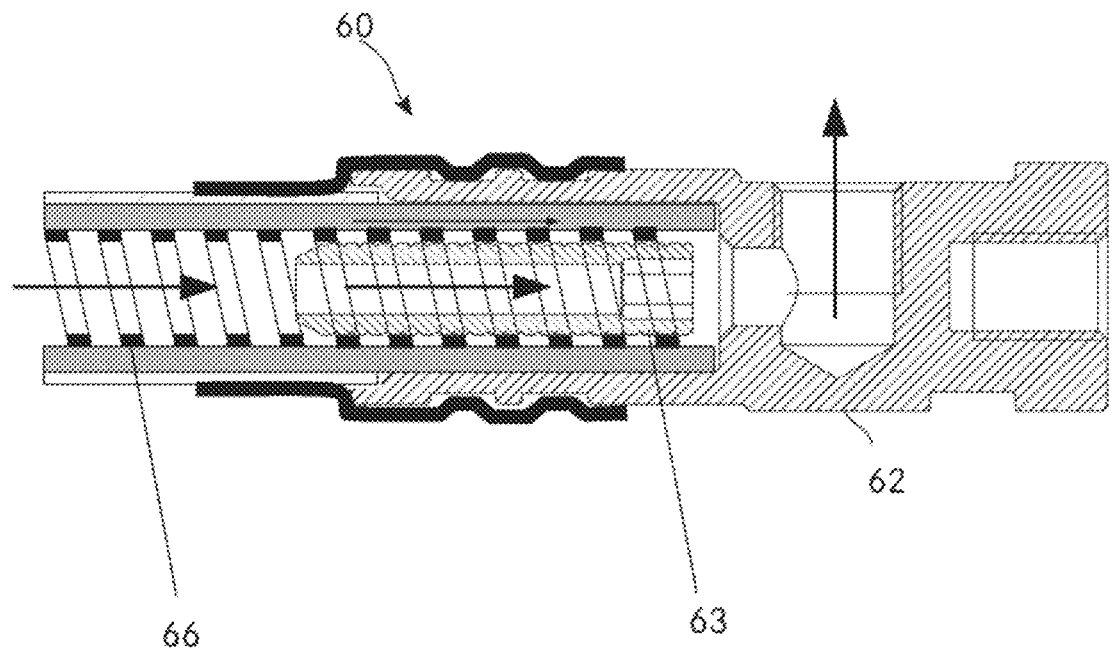
FIG. 4 shows a detail of an axial section of a third embodiment of the inventive fluid-coolable individual line unit.

FIG. 4 is a schematic partial view of an axial section through a third embodiment of the inventive fluid-coolable individual line unit 60. This embodiment largely corresponds to the first embodiment of the fluid-coolable individual line unit 30. In contrast to the first embodiment, in this embodiment the helix 66 surrounds the counterpressure element 63. The counterpressure element is thus designed in such a way that it can be pushed into the central channel parallel to the open support structure. In the case of the helix 66 and the hollow-cylindrical counterpressure element 63, the outer diameter of the counterpressure element is thus selected in such a way that it can be pushed into the helix. In this case, too, the counterpressure element can be formed in one piece with the housing 62, and it is also possible in this case to arrange the separate counterpressure element 63 on the housing 62.

Figure 5:
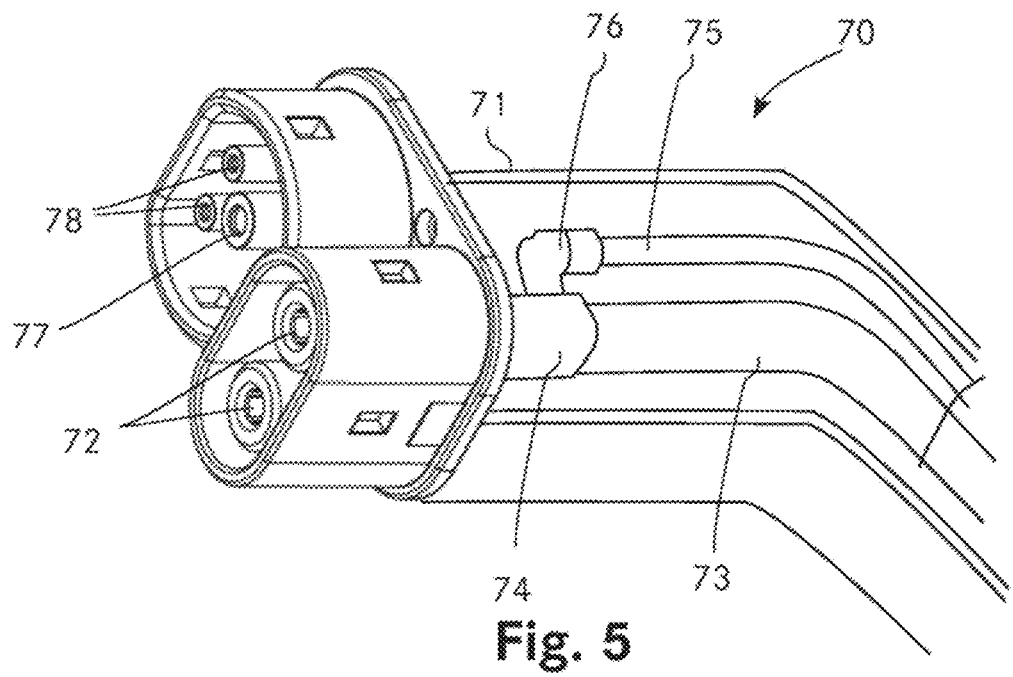
FIG. 5 shows an oblique view of a charging plug connector of an inventive DC charging cable.
Figure 6:
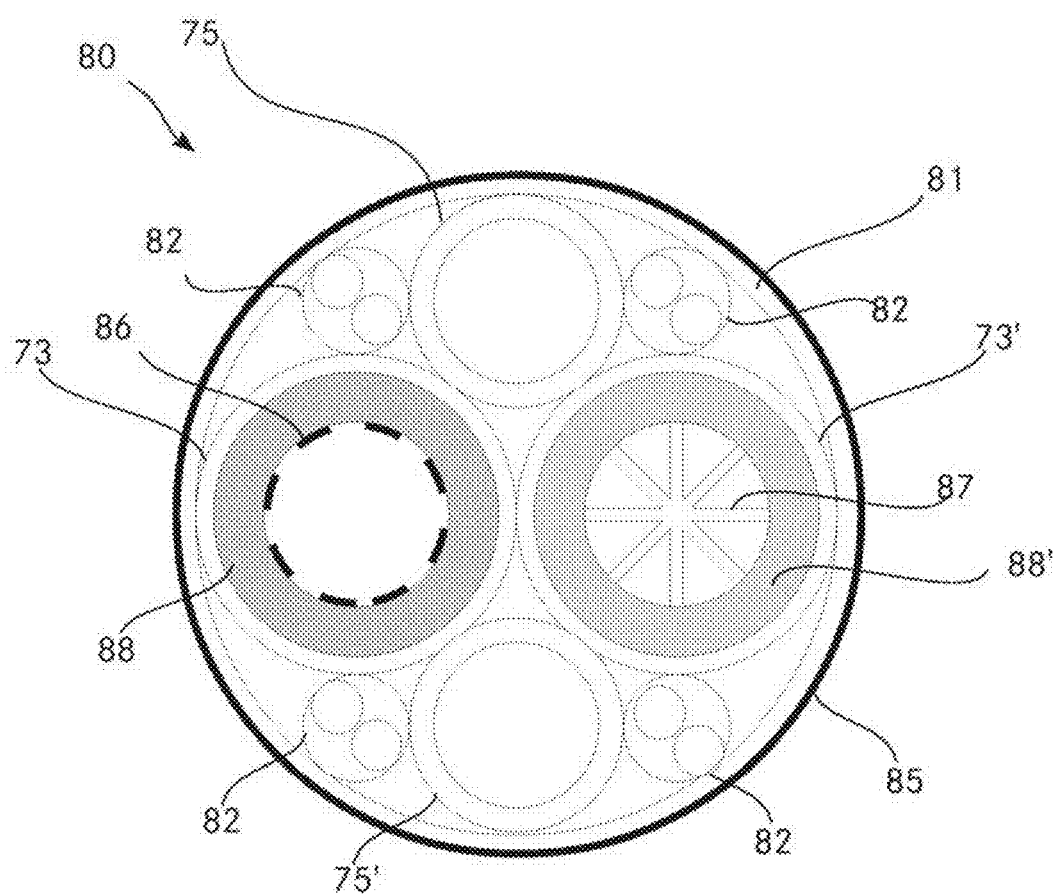
FIG. 6 shows a cross section through a charging cable having two individual lines, a neutral conductor, eight signal lines, and two hoses.
Figure 7:
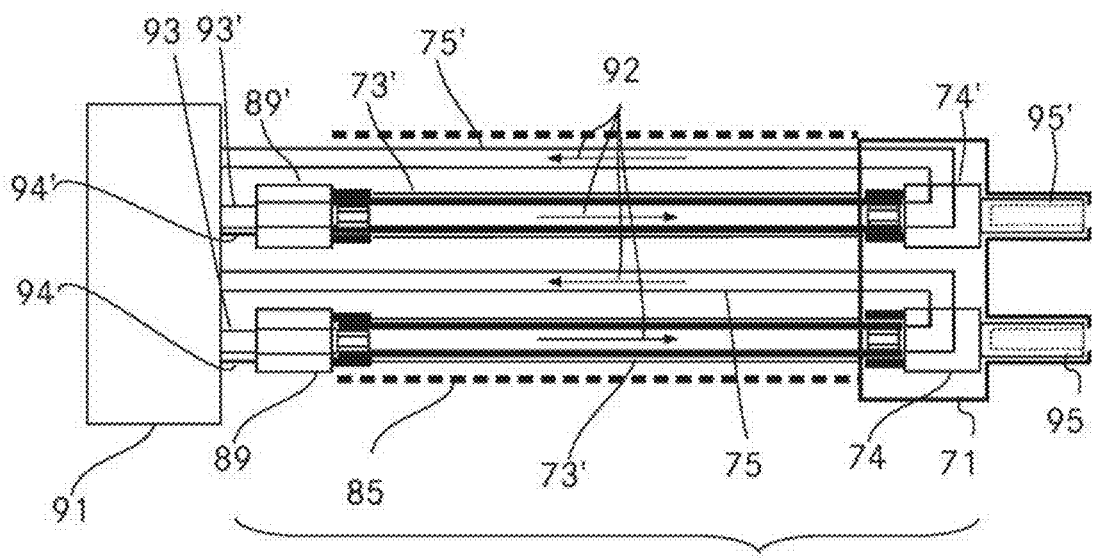
FIG. 7 shows a schematic illustration of a DC charging cable having two fluid-coolable individual line units and a charging plug connector.

FIGS. 5-7 show various views of a DC charging cable.

FIG. 5 illustrates the charging plug connector 70 in an oblique view. It comprises an IEC 62196-3 standardized charging plug housing 71, only half of which is illustrated here. The charging plug connector 70 has a first and a second DC plug contact 72, 72', which are in each case formed by contact parts of the inventive connection elements and are connected by these to fluid-cooled individual lines. In this example, only the first individual line 73 with a first connection element 74 is shown. The cooling liquid is returned by means of the cooling hose 75, which is connected to the connection opening of the connection element 74 via a fluid connection piece 76. The charging plug connector also comprises a neutral conductor pin 77 and two a first and a second signal pin 78, 78'.

A cross section through the DC charging cable 80 is shown in FIG. 6. This comprises the first and a second individual line 73, 73', the neutral conductor 81, eight signal lines, which are each combined in pairs in the four sheaths 82, and two cooling hoses 75, 75'. The cooling hoses are made of a flexible, heat-resistant and fluidtight material and have a round cross section. Depending on the application and above all on the cooling fluid used, polyurethane, polyethylene, silicone, polyvinyl and polyamide are suitable, for example. The signal lines are shielded by an aluminum/polyester tape. However, it is also possible to use other shielding tapes. The neutral conductor 81 is constructed as a shielding braid and encloses all the abovementioned lines and hoses: the individual lines 73, 73', the sheaths 82 with the signal lines, and the cooling hoses 75, 75'. All of this is surrounded by a common protective jacket 85. It combines individual lines 73, 73', the neutral conductor 81 and the signal lines within a common protective jacket 85 and connects the charging plug connector 70 to the charging station. The protective jacket 85 has the shape of a round hollow cylinder with an inside diameter which results from twice a single line diameter and twice the thickness of the shielding braid of the neutral conductor 81. The first and second individual lines 73, 73' both have a round cross section and the same diameter. The first individual line 73 uses a helix 86 and the second individual line 73' an open star-shaped profile 87 as a support structure. The different support structures are shown here only to illustrate the possible use of different support structures. Advantageously, however, both individual lines have the same support structure. Both individual lines have a conductor arrangement 88, 88' which comprises two conductor braid layers arranged concentrically to one another.

The first and the second individual line 73, 73' are arranged adjacent to one another and touch one another. The two cooling hoses 75, 75', which return the cooling fluid of the individual lines 73, 73', are each arranged in such a way that they are in contact with one of the individual lines 73 and 73' and the neutral conductor 81. This results in a compact arrangement of all components of the DC charging cable 80 and of the two individual lines 73, 73'. In addition, there are eight contact points in this arrangement which support the insulation 85.

At an outside diameter of 31 mm, the DC charging cable has a conductor cross section of 35 mm$^2$ and is designed to be able to transmit a continuous DC current of 700 A over 7 m without the surface temperature of the DC charging cable becoming hotter than 50° when cooled with water at a temperature of 20° C. and a flow rate of 1.8 l/min.

FIG. 7 shows schematically the charging cable connected to a DC charging station 91 according to the exemplary embodiment shown in FIGS. 5 and 6. In the greatly simplified illustration, the signal lines and the neutral conductor as well as the pins are not shown. Two of the eight signal lines are connected to the signal pins 78 (FIG. 5). The remaining signal lines can be used, inter alia, for moisture and temperature sensors in the charging plug.

The two individual lines 73, 73' each comprise a first connection element 74, 74' and a second connection element 89, 89' at their two ends. The first connection elements 74, 74' are arranged in the charging plug housing 71. Both connection elements each have a contact part 95, 95' with a female socket. The cooling fluid cooled down by the DC charging station is supplied to both connection elements via the central channel of the respective individual line 73, 73'. The return takes place via the cooling hose 75, 75' connected in each case to the connection opening of the first connection element 74, 74'.

The individual lines 73, 73' are each connected to the DC charging station 91 via a second connection element 89, 89'. The cooled cooling fluid is in each case supplied to the central channel of the respective individual line 73, 73' via a fluid outlet line 93, 93' and the respective connection opening of the second connection element 89, 89'. In this exemplary embodiment, the connection opening is embodied axially or parallel to the compression section of the respective second connection element 89, 89'. The second connection element 89, 89' in each case has a means for the electrical connection of the respective individual line 73, 73' to one of the two power connections 94, 94' of the electric charging station, for example to a busbar.

In summary, it may be stated that a connection element has been provided which makes possible a mechanically robust and at the same time inexpensive connection to a fluid-cooled conductor which has a central fluid channel surrounded by a concentric conductor. The connection elements are suitable both for the connection of the charging connector to the individual lines and for the connection of the individual lines to a charging station. As a result, fluid-coolable DC charging cables become more robust and at the same time less expensive.

The invention claimed is:

1. A connection element for electrically connecting an individual line which has a concentric conductor arrangement and a central channel for a cooling fluid, the connection element comprising:
   a. an electrically conductive housing,
   b. having a sleeve-shaped compression section which is suitable for producing a compression joint with the concentric conductor arrangement,
   c. wherein the electrically conductive housing has an internal cooling channel having a connection opening for an external cooling line, said cooling channel leading into a space surrounded by the sleeve-shaped compression section,
   d. wherein the connection element furthermore comprises a counterpressure element, which can lie at least partially in the space surrounded by the sleeve-shaped compression section,
   e. wherein the counterpressure element is furthermore configured to support a concentric conductor arrangement on the inner side thereof when the sleeve-shaped compression section is compressed during the production of a compression joint, and is designed to be fluid-permeable in the pressed state in order to ensure a fluid connection through the counterpressure element.

2. The connection element as claimed in claim 1, wherein the counterpressure element substantially has a cylindrical outer contour.

3. The connection element as claimed in claim 2, wherein the counterpressure element is hollow-cylindrical and ensures fluid connection through a central through-opening.

4. The connection element as claimed in claim 2, wherein the counterpressure element is arranged on the housing.

5. The connection element as claimed in claim 4, wherein the counterpressure element is formed in one piece or as a single part with the housing.

6. The connection element as claimed in claim 1, the counterpressure element of which is dimensioned in such a way that, as it is introduced, it can take along a support structure which is arranged in the central channel and which is directly enclosed by the conductor arrangement along the longitudinal extent.

7. The connection element as claimed in claim 1, wherein the counterpressure element has a profile on its outer casing, which profile permits a positive connection to the conductor arrangement during the production of the compression joint.

8. The connection element as claimed in claim 7, wherein the housing of the connection element is produced from copper or a copper-containing alloy.

9. The connection element as claimed in claim 1, wherein the connection element comprises a contact part, wherein the contact part preferably has a female socket which is suitable for use in a DC charging plug connector for an electric vehicle.

10. The connection element as claimed in claim 9, wherein the contact part is coated with a wear-resistant, electrically highly conductive coating, wherein the coating is, in particular, a silver, gold or nickel platinum coating.

11. The connection element as claimed in claim 9, wherein the conductive contact part is detachably connected to the housing of the connection element.

12. The connection element as claimed in claim 11, wherein the conductive contact part can be connected to the housing by means of a screw connection, wherein the housing of the connecting element preferably has an internal thread, which can be screwed to an external thread of the contact part.

13. The connection element as claimed in claim 1, wherein the internal cooling channel opens axially into the space surrounded by the sleeve-shaped compression section, preferably centrally with respect to the inner circumferential surface of the sleeve-shaped compression section.

14. The connection element as claimed in claim 1, wherein the connection opening is arranged perpendicularly to a connection direction of the individual line and preferably has an internal thread.

15. A fluid-coolable individual line unit for a charging cable, which
   a) has a first connection element according to claim 1, and
   b) an individual line having a first and a second end, the individual line comprising:
      a. a concentric conductor arrangement,
      b. insulation,
         i. wherein there is at least one central channel for a cooling fluid, which is enclosed by the conductor arrangement, and
         ii. the insulation directly encloses the conductor arrangement and is impenetrable and electrically insulating for the cooling fluid, and
         iii. wherein the individual line has a first stripped end piece at its first end, on which the insulation is axially set back with respect to the conductor arrangement,
      wherein the inner circumferential surface of the compression section of the first connection element is in a radial compression joint with the conductor arrangement on the stripped end piece, as a result of which an electrical connection between the connection element and the concentric conductor arrangement,
      wherein furthermore
   c) a counterpressure element is arranged in the central channel so that it lies at least partially in the space surrounded by the sleeve-shaped compression section, and supports the concentric conductor arrangement on the inside thereof and, at the same time, is in a compression joint with the concentric conductor arrangement, d) wherein the counterpressure element permits a fluid connection through the central channel of the individual line between the internal cooling channel of the first connection element and the second end of the individual line.

16. The fluid-coolable individual line unit as claimed in claim 15, wherein the individual line comprises a support structure, which is arranged in the central channel and has a longitudinal extent which is directly enclosed by the conductor arrangement along the longitudinal extent, wherein the support structure is arranged between the counterpressure element and the second end of the individual line.

17. The fluid-coolable individual line unit as claimed in claim 15, wherein the conductor arrangement can be penetrated by the cooling fluid in the central channel.

18. The fluid-coolable individual line unit as claimed in claim 15, which comprises a sealing means which produces a fluidtight connection between the sleeve-shaped compression section and the insulation of the individual line, wherein the sealing means preferably comprises a flexible hose, in particular a shrink-on hose.

19. The fluid-coolable individual line unit as claimed in claim 15, wherein a second connection element as claimed in claim 1 is arranged at the second end of the individual line, wherein the second connection element preferably comprises means for the electrical connection of the individual line to an electric charging station, wherein the charging station is preferably a charging station for electric vehicles, and wherein the means for electrical connection is provided for connecting the fluid-coolable individual line to a power connection or to a terminal or plug system of the electric charging station.

20. A charging cable having a charging plug connector, comprising a first and a second fluid-coolable individual line unit as claimed in claim 15, and a common protective sheath, wherein the charging plug connector comprises a charging plug housing, preferably a charging plug housing according to IEC 62196-3, wherein the charging cable is preferably a DC charging cable in which two DC connection pins of the charging plug connector are implemented by the first connection elements of the two individual lines.

21. The charging cable as claimed in claim 20, wherein the charging cable comprises at least one hose made of a fluidtight material surrounded by the common protective sheath and connected to at least one of the external cooling connections of the two first connection elements, wherein a cooling fluid passed through one of the central channels of the two fluid-coolable individual line units can be returned in the opposite direction through the at least one hose.

22. A method for producing a fluid-coolable individual line unit as claimed in claim 15, and wherein the method comprises the following steps:

a) providing an individual line, which comprises a concentric conductor arrangement and insulation, wherein there is in the individual line at least one central channel for a cooling fluid, which is enclosed by the conductor arrangement, and wherein the insulation directly encloses the conductor arrangement and is impenetrable and electrically insulating for the cooling fluid, b) providing a connection element, and c) stripping the individual line at a first end, with the result that the first end has a first stripped end piece, on which the insulation is axially set back with respect to the conductor arrangement, d) introducing, in particular screwing, the counterpressure element into the central channel of the individual line, e) pushing the sleeve-shaped compression section of the connection element onto the first stripped end piece, f) wherein the counterpressure element is introduced into the conductor arrangement to such an extent that, after the sleeve-shaped compression section has been pushed on, the conductor arrangement and the sleeve-shaped compression section completely enclose the counterpressure element, at least in a partial section, and g) producing a radial compression joint between the sleeve-shaped compression section and the conductor arrangement by means of a pressing tool in the region of the partial section, with the result that the counterpressure element supports the conductor arrangement toward the inside during the pressing operation.

23. The method as claimed in claim 22, a) wherein the individual line furthermore comprises a support structure having a longitudinal extent, b) the support structure is arranged in the central channel and is directly enclosed by the conductor arrangement along the longitudinal extent, c) wherein an optionally present longitudinal section of the support structure is pushed back in the longitudinal direction as the counterpressure element is introduced.

24. The method as claimed in claim 23, wherein the pushing on of the sleeve-shaped compression section of the connection element and the introduction of the counterpressure element take place simultaneously.

25. The method as claimed in claim 22, wherein the pressing is carried out with a pressing tool which has a two-part hexagonal die.

26. The method as claimed in claim 22, wherein the pressing takes place at two different positions offset axially with respect to the compression sleeve.

* * * * *